Figure 1:
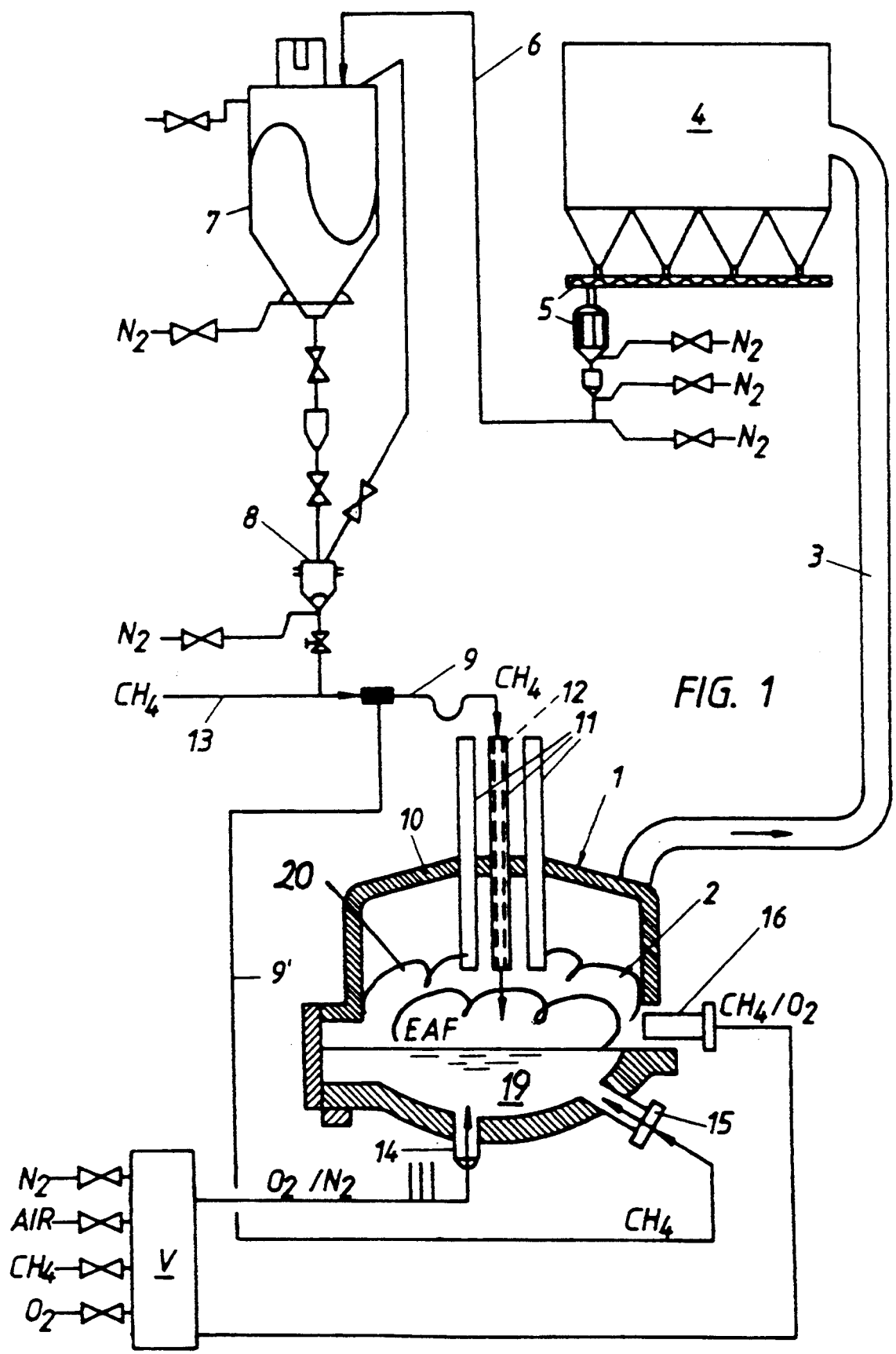

United States Patent

Berger et al.

Patent Number: 5,366,538
Date of Patent: Nov. 22, 1994

[54] PROCESS FOR THE PRODUCTION OF A METAL MELT

[75] Inventors: Harald Berger, Linz; Johannes Steins, Gallneukirchen, both of Austria; Klaus Klintworth, Buxtehude, Germany

[73] Assignees: Voest-Alpine Industrieanlagenbau GmbH, Linz, Austria; KCT Technologies GmbH, Hamburg, Germany

[21] Appl. No.: 90,709

[22] Filed: Jul. 13, 1993

[30] Foreign Application Priority Data

Jul. 16, 1992 [AT] Austria .................. A 1463/92

[51] Int. Cl.$^5$ .................. C21B 3/04; C21C 5/38
[52] U.S. Cl. .................. 75/528; 75/10.38; 75/549
[58] Field of Search .................. 75/549, 528, 10.38

[56] References Cited

U.S. PATENT DOCUMENTS

| | | | |
|---|---|---|---|
| 2,805,930 | 9/1957 | Udy | 75/10.46 |
| 2,894,831 | 7/1959 | Old | 75/10.38 |
| 3,215,523 | 11/1965 | Richardson | 75/549 |
| 3,411,896 | 11/1968 | Urban | 75/549 |
| 3,494,763 | 2/1970 | Kato | 75/549 |
| 3,769,000 | 10/1973 | Glassman | 75/549 |
| 3,948,644 | 4/1976 | Maurice | 75/25 |
| 4,080,195 | 3/1978 | Widell | 75/11 |
| 4,218,241 | 8/1980 | Hegemann | 75/549 |
| 4,324,390 | 4/1982 | Driemeyer | 266/155 |

FOREIGN PATENT DOCUMENTS

| | | |
|---|---|---|
| 0010647 | 5/1980 | European Pat. Off. |
| 2132666 | 1/1973 | Germany |
| 2412887 | 10/1974 | Germany |
| 939377 | 10/1993 | United Kingdom |

*Primary Examiner*—Peter D. Rosenberg
*Attorney, Agent, or Firm*—Hopgood, Calimafde, Kalil & Judlowe

[57] ABSTRACT

In a process for the production of a metal melt in a metallurgical vessel, the filter dusts incurring in producing the metal melt are to be processed to charging substances without causing a load on the environment and without great expenditures.

This is achieved in that the filter dusts are introduced into the metallurgical vessel by aid of a gaseous conveying medium composed of natural gas or a mixed gas primarily containing natural gas, the filter dusts being supplied to the metallurgical vessel in a closed system and reduced by the carrier gas.

15 Claims, 2 Drawing Sheets

PROCESS FOR THE PRODUCTION OF A METAL MELT

The invention relates to a process for the production of a metal melt, in particular a steel melt, in a metallurgical vessel, such as an electric arc furnace or a converter, by processing filter dusts incurring in the production of metal melt, in particular in the production of steel, as well as an arrangement for carrying out the process.

When producing metal melts, such as molten pig iron in an electric arc furnace or in a converter, considerable amounts of filter dust (about 15 kg/ton crude steel) incur, the disposal of which constitutes an increasing problem. On the one hand, dumping facilities are getting limited more and more, on the other hand extremely high expenditures in terms of plant and equipment as well as in terms of energy are necessary for briquetting filter dusts to form suitable briquets.

In contrast to ores or oxides, filter dusts partially contain considerable dusty metallic portions that tend to oxidize under the development of heat. This metallic portion is very finely distributed in the filter dust and hence may cause vigorous explosion-like reactions.

It is internally known to introduce filter dusts forming in the production of steel into an electric arc furnace for the production of steel through hollow electrodes by aid of an inert gas. In doing so, it has, however, turned out that the use of filter dusts, i.e., their processing to steel, is not feasible and that the filter dusts leave the electric arc furnace more or less unchanged such that the load on the environment caused by the filter dusts remains nearly the same.

The invention aims at avoiding these disadvantages and difficulties and has as its object to provide a process of the initially defined kind, by which it is possible To utilize filter dusts incurring in the production of a metal melt, in particular filter dusts incurring in the production of steel, without causing any load on the environment, the metal content of the filter dusts being beneficial to metal production.

In accordance with the invention, this object is achieved in that the filter dusts are conveyed into the metallurgical vessel by aid of a gaseous conveying medium composed of natural gas or a mixed gas primarily containing gaseous hydrocarbons, wherein the filter dusts are supplied to the metallurgical vessel in a closed system and are reduced by aid of the carrier gas and then are melted.

The special effect of the process according to the invention is to be seen in that explosion-like reactions are safely avoided due to the filter dusts being conducted (stored, transported, blown in) in a closed system, avoiding the entry of false air. Another essential advantage of the process according to the invention is to be seen in that the oxidic components of the filter dusts are reduced by the natural gas being a pure reducing gas, immediately after having been introduced into the metallurgical vessel, i.e., directly on the entry site, within a very short span of time. When blowing in a coal-dust mixture by aid of an inert gas, CO must at first be formed from the coal as a reducing gas, for which purpose the residence time of the blown in filter dusts in the hot zones of the metallurgical vessel, for instance, in the electric arc, does not suffice. For this reason, the filter dusts remain unreduced in known processes and are sucked off again as such without any change.

According to a preferred embodiment, the filter dusts are introduced into the electric arc of a graphite electrode through a central longitudinal passage of the graphite electrode by means of the carrier gas. As the natural gas leaves the electrode tip, a cooling effect also occurs at the point of exit due to the natural gas being cracked to C and $H_2$ such that the consumption of the electrode tip can be minimized. The CO and $H_2$ formed from the natural gas in the electric arc burn with the false air present within the metallurgical vessel, thus providing an additional energy input by the natural gas.

Suitably, the filter dusts are blown into a foamed slag floating on the melt. The respective reducing and melting reactions occur in the foamed slag. In this process, the $CH_4$ is split into its components C and H under the thermal influence, these, at first, being taken up by the foamed slag. C and H combine with the O of the molten oxides in the slag, CO and $H_2O$ escaping as gases, causing the slag to foam.

From DE-A-2 132 666 it is known for recovering metals, in particular steel, frown ores, and manganese from manganese oxide or ferromanganese from manganese ores, to conduct ores or metal oxides through the burning column of the electric arc together with the reducing gases, which, however, is out of the question in respect of filter dusts on account of the latent risk of explosion involved.

Another advantageous embodiment is characterized in that the filter dusts are introduced into the metallurgical vessel by aid of the gaseous conveying medium via at least one immersed nozzle. When using immersed nozzles, the natural gas likewise acts as an immediate reducing gas and, at the same time, also as a cooling medium for the immersed nozzles.

Advantageously, the gaseous conveying medium essentially is composed of natural gas or other gaseous hydrocarbons as well as of nitrogen and/or argon, the mixed gas suitably being composed of natural gas by approximately 80%.

By the process according to the invention, it is feasible to introduce filter dusts into the metallurgical vessel in an amount ranging between 20 and 200 kg/min.

Advantageously, the gaseous medium is set under a pressure of up to about 20 bar, suitably being fed with up to 30 kg filter dusts per cubic meter in the normal state.

An arrangement for carrying out the process according to the invention is characterized by the following characteristic features:
- a metallurgical vessel for producing a metal melt,
- a dedusting means, which is connected with the metallurgical vessel via an offgas duct and includes a dust collecting silo,
- a pressure blowing vessel, which is supplied with filter dusts frown the dust collecting silo via a duct,
- a dust conveying duct for conveying the filter dusts into the metallurgical vessel,
- a natural-gas feed duct running into the dust conveying duct or a feed duct feeding gaseous hydrocarbons into the dust conveying duct,
- at least one electrode having a central longitudinal passage, into which the dust conveying duct enters, and/or at least one immersed nozzle, into which the dust conveying duct enters, the metallurgical vessel forming a closed system with the dedusting means, the pressure blowing vessel, the dust conveying duct and the electrode.

Figure 2:
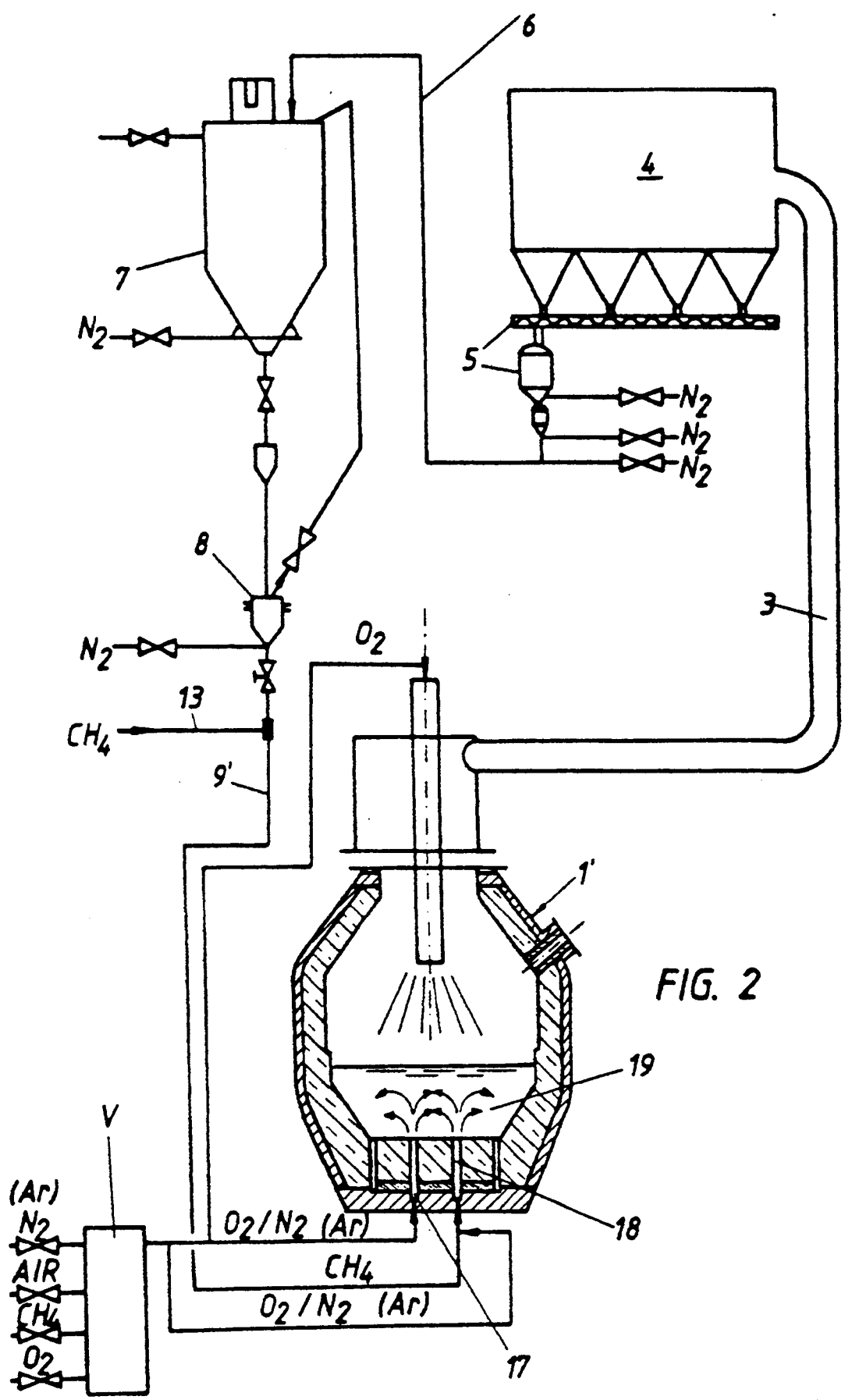

In the following, the invention will be explained in more detail by way of two exemplary embodiments and with reference to the accompanying drawings, wherein FIG. 1 schematically illustrates the introduction of filter dusts into an electric arc furnace; and FIG. 2 represents the introduction of filter dusts into a steelworks converter in an illustration analogous to FIG. 1.

From an electric arc furnace 1 serving for the production of steel, the offgas forming in its interior 2 is fed to the dry filtering means 4 of a dedusting plant via an offgas duct 3. The dust depositing in the dry filtering means is conveyed to a dust collecting silo 7 pneumatically by nitrogen via an intermediate transporting means 5 through a duct 6. The filter dusts fall from the dust collecting silo 7 into a pressure blowing vessel 8 located therebelow and also fed with nitrogen under a pressure of about 20 bar.

From there, the filter dusts, via a dust conveying duct 9, reach at least one of the graphite electrodes 11 passing the lid 10 of the electric arc furnace and configured as hollow electrodes each having a central longitudinal passage 12. Natural gas fed through a feed duct 13 serves as the gaseous conveying medium for conveying the filter dusts from the pressure blowing vessel 8 through the hollow electrode 11 into the interior of the electric arc furnace 1.

The natural-gas pressure in the dust conveying duct 9 may amount up to 20 bar. Per $Nm^3 CH_4$, up to 30 kg dust may be conveyed, which corresponds to a natural-gas consumption of about 1 $Nm^3$/ton molten pig iron. Preferably, 20 to 200 kg dust per minute and electrode 11 may be fixed as the blowing rate, yet the blowing rate required basically may be optionallly adapted to the respective amount of dust incurred and to the size of the furnace. The duct cross section and the cross section of the passage 12 are functions of the amount of dust to be blown in.

When using hollow electrodes, the advantage of the invention resides in that the oxidic components of the filter dusts, upon entry into the foamed slag 20 floating on the melt 19, are reduced at once in the electric arc by the natural gas immeditaly cracked into C →CO and $H_2$ as pure reducing gases in the electric arc.

Additional advantages are the cooling effect of the natural gas when leaving the exit site at the electrode tip and the possibility of an additional energy input by burning C or CO and $H_2$ with false air present in the furnace.

As is apparent from FIG. 1, the electric arc furnace 1, in addition to a conventional bottom flushing nozzle 14, comprises at least one further immerged nozzle 15, through which filter dusts also may be introduced into the bath by aid of natural gas via the dust conveying duct 9'.

Furthermore, one or several gas-oxygen afterburning burner lances 16 are inserted in the upper part of the electric arc furnace 1 for afterburning CO, which are supplied with $O_2, CH_4, N_2$ and air from a valve station V, the composition of these gases being adjustable according to the operational conditions desired.

According to the embodiment illustrated in FIG. 2, a steelworks converter 1' is provided as the metallurgical vessel, which is equipped with bottom nozzles 17, 18. Filter dusts are introduced into the melt 19 via one or several of the bottom nozzles 18 in the above-described manner, i.e., by means of natural gas as the carrier gas or a mixed gas comprised of natural gas and nitrogen and-/or argon. Also in this case, the natural gas functions as an immediate reducing gas and, at the same time, as a cooling medium.

The advantages of the process according to the invention, in particular, are to be seen in that:

the filter dusts are conducted in a system completely cut off the outside world, from the separation in the filter 4 to the re-introduction into the melt the oxidic filter dusts are reduced in the electric arc, the output thus being improved investment costs and energy are saved as compared to briquetting processes the auxiliary means for the melting aggregate is small and compact, requiring little space and low investment costs the cooling effect of the natural gas when leaving the hollow electrode tip results in a lower peak consumption and, thus, in a lower electrode consumption energy is gained by burning the natural gas in the electric arc with the false air present in the metallurgical vessel 1, 1'.

By the process and the arrangement according to the invention, it is feasible to utilize in an efficient manner any filter dusts incurring in a metal production plant, hence also filter dusts incurring in other metallurgical vessels additonally provided, for instance, in a steelworks.

What we claim is:

1. A process for producing a metal melt in a metallurgical vessel from metalliferous filter dusts formed during the production of a metal melt which comprises:
    providing a gaseous conveying medium comprised of a reducing carrier gas,
    conveying said metalliferous filter dusts in a closed system to said metallurgical vessel by means of said reducing carrier gas,
    reducing said metalliferous filter dusts in said vessel to metal by means of said reducing carrier gas, and
    melting said metal produced from said filter dusts.

2. A process for producing a metal melt in a metallurgical vessel from metalliferous filter dusts formed during the production of a metal melt, said vessel having electrodes at least one of which has a central longitudinal passage therethrough which comprises:
    passing said metalliferous dusts formed in said vessel during the production of the metal melt to a dedusting means including a dust collecting silo via an offgas duct connected to said metallurgical vessel,
    passing said collected filter dusts from said silo through a duct to a pressure blowing vessel,
    passing said filter dust from said pressure blowing vessel to and through said central longitudinal passage of said at least one electrode in said metallurgical vessel while suspended in a reducing carrier gas,
    reducing said filter dusts in said metallurgical vessel by means of said reducing carrier gas; and
    melting said metal in said metallurgical vessel reduced from said filter dusts.

3. A process as set forth in claim 1, wherein said gaseous conveying medium is comprised of natural gas.

4. A process as set forth in claim 1, wherein said gaseous conveying medium is comprised of a mixed gas primarily containing gaseous hydrocarbons.

5. A process as set forth in claim 1, wherein a graphite electrode having a central longitudinal passage is provided to form an electric arc and said filter dusts are introduced into said electric arc through said central longitudinal passage by aid of said carrier gas.

6. A process as set forth in claim 5, wherein a foamed slag is floating on said metal melt and said filter dusts are blown into said foamed slag.

7. A process as set forth in claim 1, wherein at least one immersed nozzle is provided in said metallurgical vessel and said filter dusts are introduced into said metallurgical vessel by aid of said gaseous conveying medium through said at least one immersed nozzle.

8. A process as set forth in claim 1, wherein said gaseous conveying medium is comprised primarily of natural gas as well as of at least one of nitrogen and argon.

9. A process as set forth in claim 1, wherein said gaseous conveying medium is comprised of a mixed gas primarily formed of gaseous hydrocarbons as well as of at least one of nitrogen and argon.

10. A process as set forth in claim 9, wherein said mixed gas is formed of natural gas by 80%.

11. A process as set forth in claim 1, wherein said filter dusts are introduced into said metallurgical vessel in an amount ranging between 20 and 200 kg/min.

12. A process as set forth in claim 1, wherein said gaseous conveying medium is set under a pressure of about 20 bar.

13. A process as set forth in claim 1, wherein said gaseous conveying medium is fed with up to 30 kg filter dusts per cubic meter in the normal state.

14. An arrangement for producing a metal melt by processing filter dusts which occur during the production of a metal melt, which arrangement comprises:
 a metallurgical vessel having electrodes for producing said metal melt,
 a dedusting means including a dust collecting silo, and an offgas duct connecting said metallurgical vessel to said dedusting means,
 a pressure blowing vessel and a duct means for supplying filter dusts from said dust collecting silo to said pressure blowing vessel,
 a dust conveying duct for conveying said filter dusts into said metallurgical vessel,
 a gaseous hydrocarbon feed duct coupled to said dust conveying duct, and
 at least one of said electrodes having a central longitudinal passage adapted to connect to said dust conveying duct and/or at least one immersed nozzle coupled to said dust conveying duct, said metallurgical vessel comprising a closed system with said dedusting means, said pressure blowing vessel, said dust conveying duct and said electrode.

15. An arrangement as set forth in claim 13, wherein said gaseous hydrocarbons passing through said feed duct are comprised of natural gas.

* * * * *